United States Patent
Yang et al.

(10) Patent No.: US 12,466,620 B2
(45) Date of Patent: Nov. 11, 2025

(54) ONE-WAY VALVE AND RELATED CONTAINER KIT

(71) Applicant: Universal Trim Supply Co., Ltd., New Taipei (TW)

(72) Inventors: Shih-Sheng Yang, Taipei (TW); Chih-Wei Yang, Taipei (TW); Po-Jen Chen, Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 18/639,982

(22) Filed: Apr. 19, 2024

(65) Prior Publication Data

US 2025/0326541 A1    Oct. 23, 2025

(51) Int. Cl.
*B65D 51/16* (2006.01)
*F16K 15/14* (2006.01)

(52) U.S. Cl.
CPC ........ *B65D 51/1644* (2013.01); *F16K 15/148* (2013.01)

(58) Field of Classification Search
CPC ........................... B65D 51/1644; F16K 15/148
USPC ............... 220/203.13, 203.29, 231; 215/262; 137/854
See application file for complete search history.

(56) References Cited

U.S. PATENT DOCUMENTS

| | | | | |
|---|---|---|---|---|
| 3,454,182 A | * | 7/1969 | Morton | F16K 15/04 137/513.5 |
| 6,516,829 B1 | * | 2/2003 | Townsend | F16K 15/148 137/854 |
| 2003/0075542 A1 | * | 4/2003 | Lin | B65D 51/1644 220/203.13 |
| 2004/0084450 A1 | * | 5/2004 | Havens | B65D 51/1644 220/203.07 |
| 2008/0217335 A1 | * | 9/2008 | Chen | B65D 81/2038 220/231 |
| 2021/0300644 A1 | | 9/2021 | Hirdler | |

FOREIGN PATENT DOCUMENTS

| | | |
|---|---|---|
| CN | 102963606 A | 3/2013 |
| CN | 108001836 A | 5/2018 |
| CN | 207670966 U | 7/2018 |
| CN | 217321528 U | 8/2022 |
| CN | 218506574 U | 2/2023 |
| CN | 220688128 U | 3/2024 |
| JP | 56-14853 U | 2/1981 |
| JP | 4-201879 A | 7/1992 |
| JP | 2000-238827 A | 9/2000 |

(Continued)

*Primary Examiner* — James N Smalley
(74) *Attorney, Agent, or Firm* — Winston Hsu

(57) ABSTRACT

A one-way valve adapted for a container is provided and includes an upper portion, a lower portion and a plurality of protrusions. The upper portion is resiliently deformable. The lower portion is integrally connected to the upper portion. The plurality of protrusions protrude from the lower portion toward the upper portion and separated from the upper portion. Two adjacent protrusions of the plurality of protrusions are spaced apart from each other. The plurality of protrusions are configured to be abutted by an inner surface of the container to resiliently deform the upper portion by an outer surface of the container. Besides, a related container kit is also provided.

18 Claims, 20 Drawing Sheets

(56) References Cited

FOREIGN PATENT DOCUMENTS

| | | |
|---|---|---|
| JP | 2003-40321 A | 2/2003 |
| JP | 2014-196126 A | 10/2014 |
| KR | 10-2011-0090871 A | 8/2011 |
| KR | 10-2011-0114159 A | 10/2011 |
| RU | 2 180 416 C2 | 3/2002 |
| WO | WO-2021188092 A1 * | 9/2021 ............. F16K 17/02 |

* cited by examiner

ONE-WAY VALVE AND RELATED CONTAINER KIT

BACKGROUND OF THE INVENTION

1. Field of the Invention

The present invention relates to a one-way valve and a related container kit, and more specifically, to a one-way valve adapted for a container with a thin wall thickness and a related container kit.

2. Description of the Prior Art

There are various vacuum containers available in the market for food storage. The vacuum container usually includes a containing component and a one-way valve. The containing component is for accommodating food. The one-way valve is mounted on the containing component. The one-way valve can allow air to be drawn out of the containing component, e.g., by a vacuum pump, and prevent ambient air from entering into the containing component. However, the conventional one-way valve requires a thick wall thickness of the containing component, so as to ensure the one-way valve to be mounted and work properly. Therefore, an improvement for the conventional vacuum container is urgently needed.

SUMMARY OF THE INVENTION

It is an objective of the present invention to provide a one-way valve adapted for a container with a thin wall thickness and a related container kit for solving the aforementioned problems.

In order to achieve the aforementioned objective, the present invention discloses a one-way valve adapted for a container. The one-way valve includes an upper portion, a lower portion and a plurality of protrusions. The upper portion is resiliently deformable. The lower portion is integrally connected to the upper portion. The plurality of protrusions protrude from the lower portion toward the upper portion and separated from the upper portion. Two adjacent protrusions of the plurality of protrusions are spaced apart from each other. The plurality of protrusions are configured to be abutted by an inner surface of the container to resiliently deform the upper portion by an outer surface of the container.

According to an embodiment of the present invention, a recessed structure is formed on the upper portion, and each of the plurality of protrusions is at least partially accommodated inside the recessed structure when the one-way valve is detached from the container and in a non-deformed state.

According to an embodiment of the present invention, a depth of the recessed structure gradually decreases from inside to outside.

According to an embodiment of the present invention, the lower portion includes a stem body and a platform structure. The stem body is integrally connected to the upper portion and configured to pass through the container when the one-way valve is mounted on the container. The platform extends from the stem body and is separated from the upper portion, and the plurality of protrusions protrude from the platform structure.

According to an embodiment of the present invention, the plurality of protrusions are arranged in a circle having a first diameter. An outer periphery of the upper portion has a second diameter, and the second diameter is greater than the first diameter.

According to an embodiment of the present invention, when the one-way valve is mounted on the container, the upper portion is configured to be at least partially separated from the outer surface of the container to provide a fluid passage formed by a space among the two adjacent protrusions of the plurality of protrusions and the inner surface of the container and a space between the upper portion and the outer surface of the container.

According to an embodiment of the present invention, the plurality of protrusions keep being abutted by the inner surface of the container and not separated from the inner surface of the container when the one-way valve is mounted on the container.

According to an embodiment of the present invention, the one-way valve further includes a channel structure and a resilient structure. The channel structure penetrates the lower portion and the upper portion and has a lower opening formed on the lower portion and an upper opening formed on the upper portion. The resilient structure extends from an upper surface of the upper portion and covers the upper opening. A thickness of the resilient structure is less than a thickness of the upper portion, and the resilient structure is movable between a protruding state and a non-protruding state according to a differential pressure between an interior air pressure of the container and an exterior air pressure.

According to an embodiment of the present invention, the one-way valve further includes a channel structure. The channel structure penetrates the lower portion and has a lower opening formed on a lower end of the lower portion and a upper opening formed on an upper end of the lower portion. The upper portion covers the upper opening, and the upper portion is movable between a protruding state and a non-protruding state according to a differential pressure between an interior air pressure of the container and an exterior air pressure.

According to an embodiment of the present invention, a plurality of extending structures are formed on an upper surface of the upper portion and configured to abut against a bottom portion of an additional container.

According to an embodiment of the present invention, a protruding ring is formed on a lower end of a stem body of the lower portion.

In order to achieve the aforementioned objective, the present invention further discloses a container kit including a container and a one-way valve configured to be mounted on the container. The one-way valve includes an upper portion, a lower portion and a plurality of protrusions. The upper portion is resiliently deformable. The lower portion is integrally connected to the upper portion. The plurality of protrusions protrude from the lower portion toward the upper portion and separated from the upper portion. Two adjacent protrusions of the plurality of protrusions are spaced apart from each other. The plurality of protrusions are configured to be abutted by an inner surface of the container to resiliently deform the upper portion by an outer surface of the container.

According to an embodiment of the present invention, a recessed structure is formed on the upper portion, and each of the plurality of protrusions is at least partially accommodated inside the recessed structure when the one-way valve is detached from the container and in a non-deformed state.

According to an embodiment of the present invention, a depth of the recessed structure gradually decreases from inside to outside.

According to an embodiment of the present invention, the lower portion includes a stem body and a platform structure. The stem body is integrally connected to the upper portion and configured to pass through the container when the one-way valve is mounted on the container. The platform extends from the stem body and is separated from the upper portion, and the plurality of protrusions protrude from the platform structure.

According to an embodiment of the present invention, the plurality of protrusions are arranged in a circle having a first diameter. An outer periphery of the upper portion has a second diameter, and the second diameter is greater than the first diameter.

According to an embodiment of the present invention, when the one-way valve is mounted on the container, the upper portion is configured to be at least partially separated from the outer surface of the container to provide a fluid passage formed by a space among the two adjacent protrusions of the plurality of protrusions and the inner surface of the container and a space between the upper portion and the outer surface of the container.

According to an embodiment of the present invention, the plurality of protrusions keep being abutted by the inner surface of the container and not separated from the inner surface of the container when the one-way valve is mounted on the container.

According to an embodiment of the present invention, the one-way valve further includes a channel structure and a resilient structure. The channel structure penetrates the lower portion and the upper portion and has a lower opening formed on the lower portion and an upper opening formed on the upper portion. The resilient structure extends from an upper surface of the upper portion and covers the upper opening. A thickness of the resilient structure is less than a thickness of the upper portion, and the resilient structure is movable between a protruding state and a non-protruding state according to a differential pressure between an interior air pressure of the container and an exterior air pressure.

According to an embodiment of the present invention, the one-way valve further includes a channel structure. The channel structure penetrates the lower portion and has a lower opening formed on a lower end of the lower portion and a upper opening formed on an upper end of the lower portion. The upper portion covers the upper opening, and the upper portion is movable between a protruding state and a non-protruding state according to a differential pressure between an interior air pressure of the container and an exterior air pressure.

According to an embodiment of the present invention, a plurality of extending structures are formed on an upper surface of the upper portion and configured to abut against a bottom portion of an additional container.

According to an embodiment of the present invention, a protruding ring is formed on a lower end of a stem body of the lower portion.

In summary, the one-way valve of the present invention utilizes the plurality of protrusions abutted by the inner surface of the container to enable the upper portion to be resiliently deformed by the outer surface of the container for allowing air inside the container to be drawn out of the container and preventing ambient air outside the container from entering into the container when the one-way valve is mounted on the container. By such configuration, the one-way valve of the present invention is not only suitable for being mounted on a container with a thick wall thickness but also especially suitable for being mounted on a container with a thin wall thickness, e.g., a cover of a mason jar. Therefore, the one-way valve of the present invention is versatile.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s)

being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is coupled to a second device, that connection may be through a direct mechanical connection, or through an indirect mechanical connection via other devices and connections.

Figure 1:
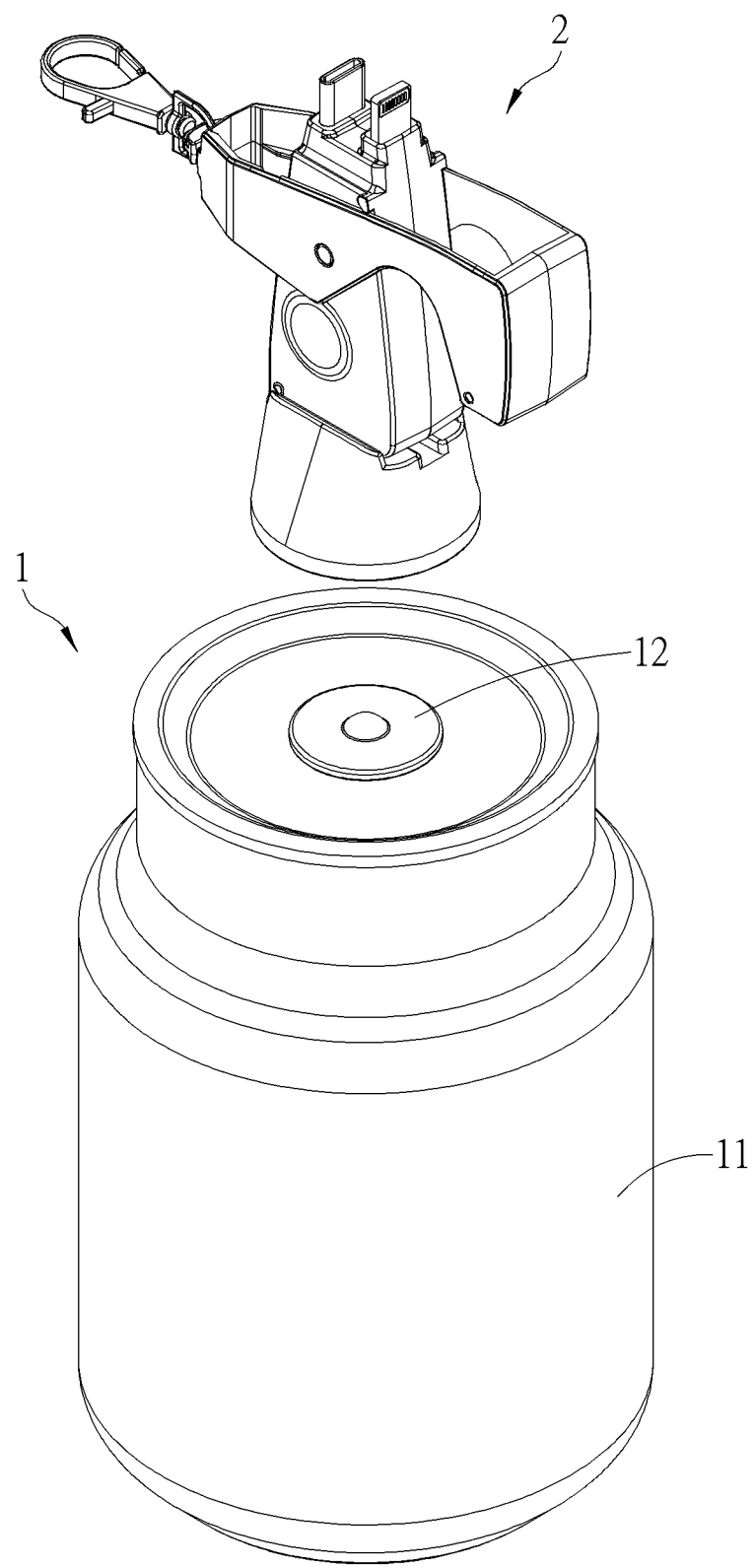
FIG. 1 is a diagram of a container kit according to a first embodiment of the present invention.
Figure 2:
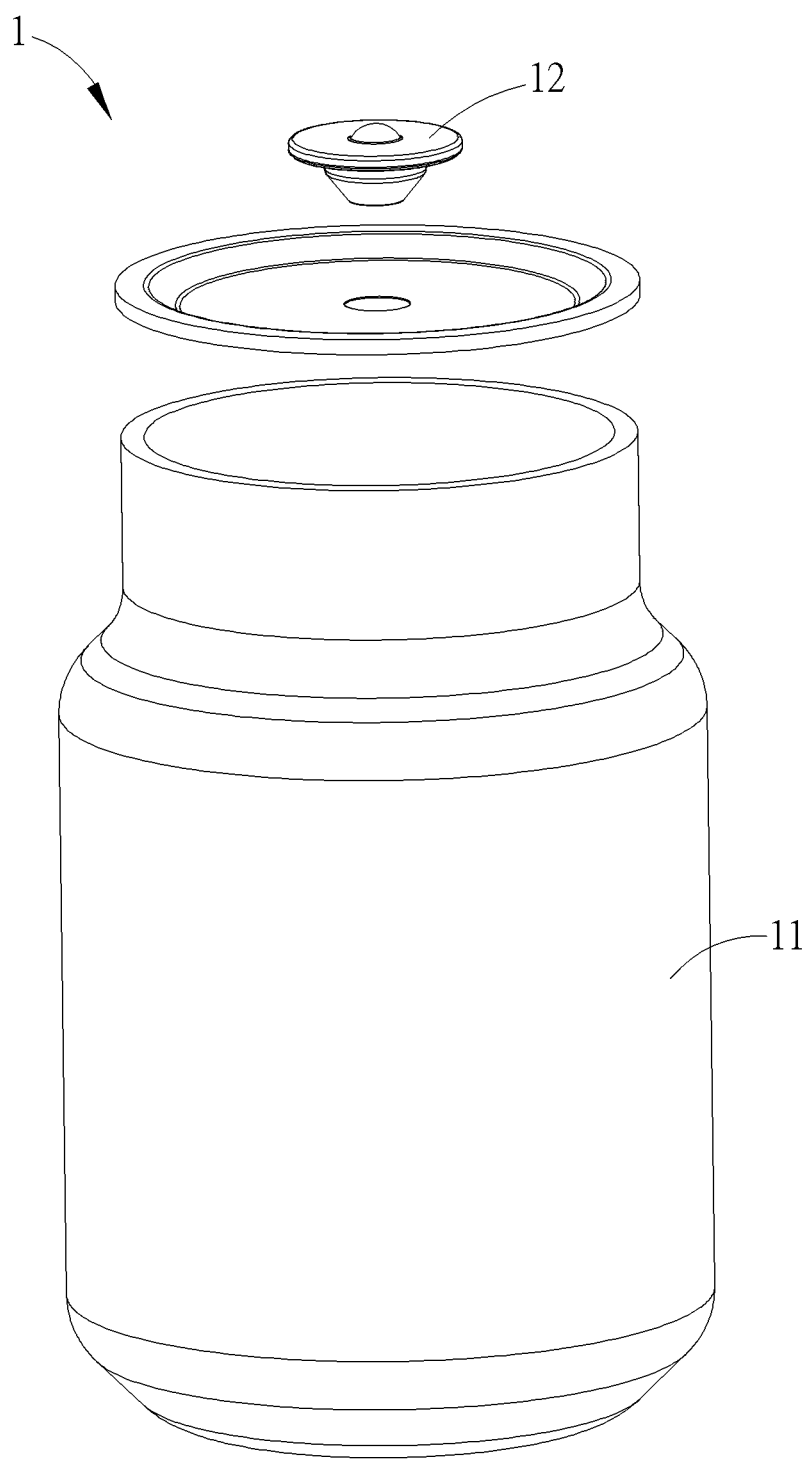
FIG. 2 is an exploded diagram of container kit according to the first embodiment of the present invention.

Please refer to FIG. 1 and FIG. 2. FIG. 1 is a diagram of a container kit 1 according to an embodiment of the present invention. FIG. 2 is an exploded diagram of the container kit 1 according to the first embodiment of the present invention. As shown in FIG. 1 and FIG. 2, the container kit 1 includes a container 11 and a one-way valve 12 configured to be mounted on the container 11 and for allowing air inside the container 11 to be drawn out of the container 11 by a vacuum device 2, e.g., a portable vacuum pump, and preventing ambient air outside the container 11 from entering into the container 11 when the one-way valve 12 is mounted on the container 11. In this embodiment, the container 11 can be a mason jar, and the one-way valve 12 can be mounted on a cover of the mason jar, which has a thin wall thickness. However, the present invention is not limited to this embodiment.

Figure 3:
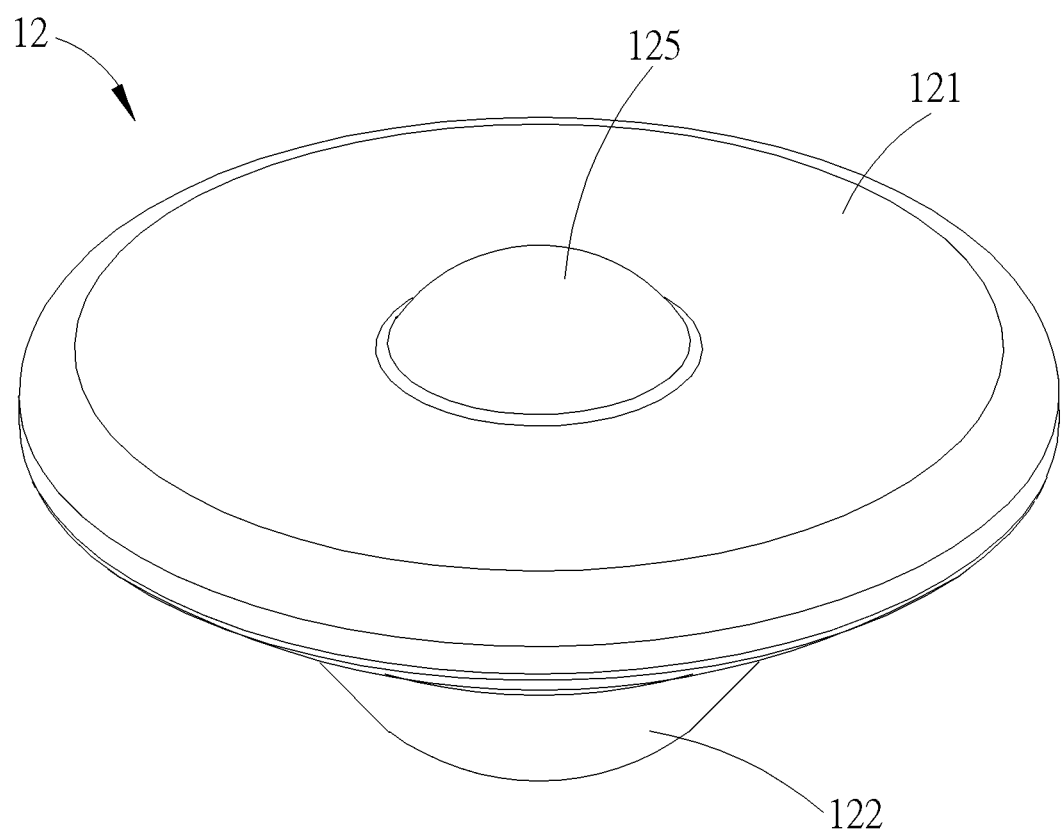
FIG. 3 and FIG. 4 are diagrams of a one-way valve at different views according to the first embodiment of the present invention.
Figure 4:
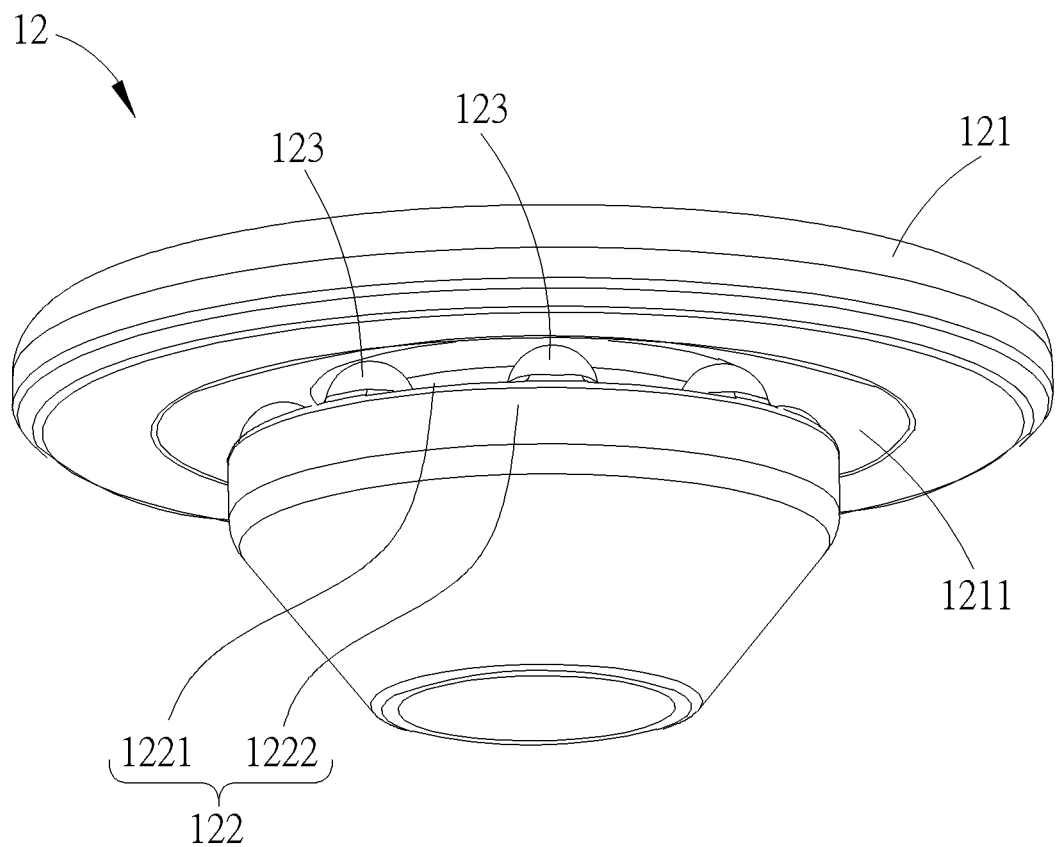
Figure 5:
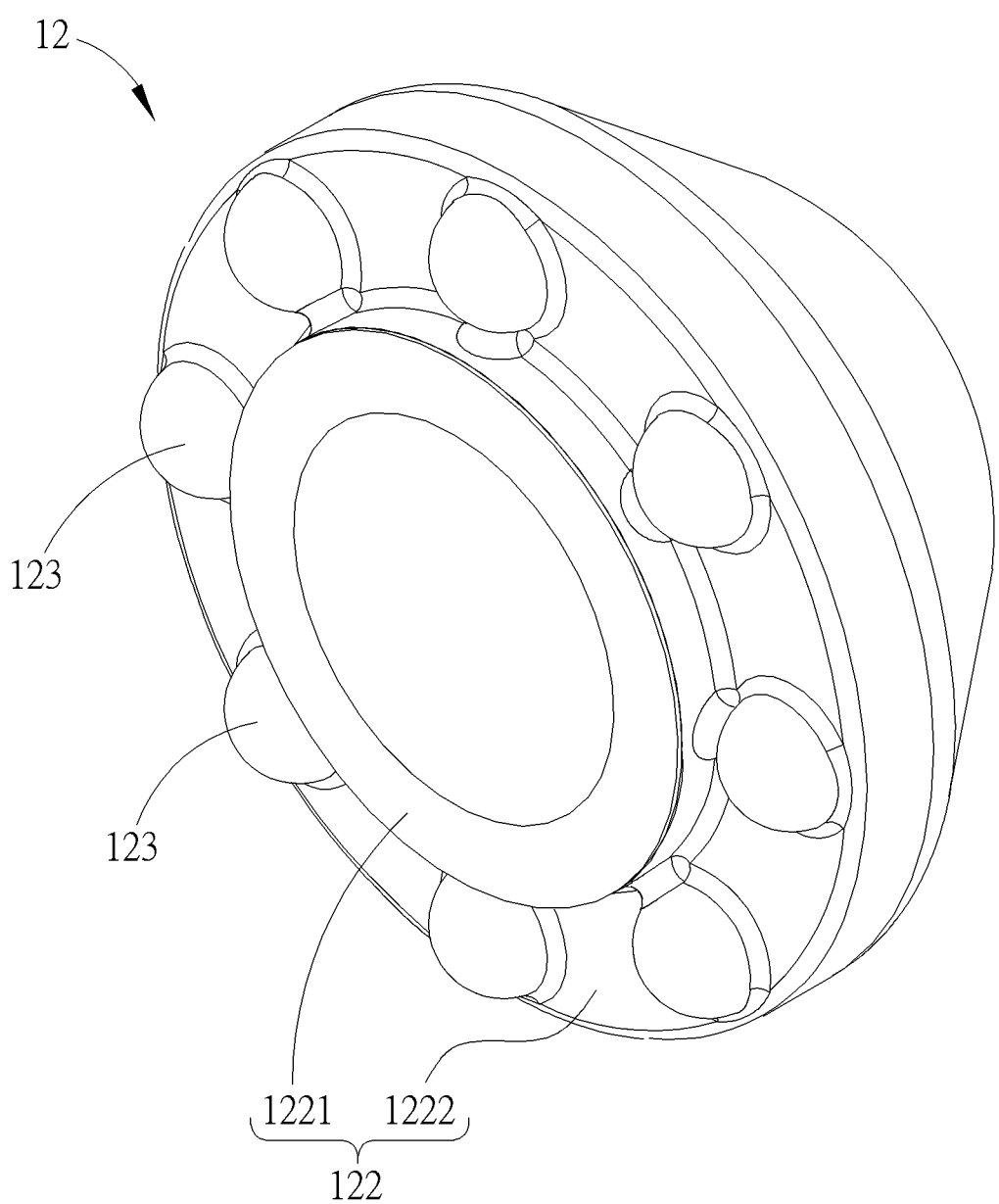
FIG. 5 is a partial diagram of the one-way valve according to the first embodiment of the present invention.
Figure 6:
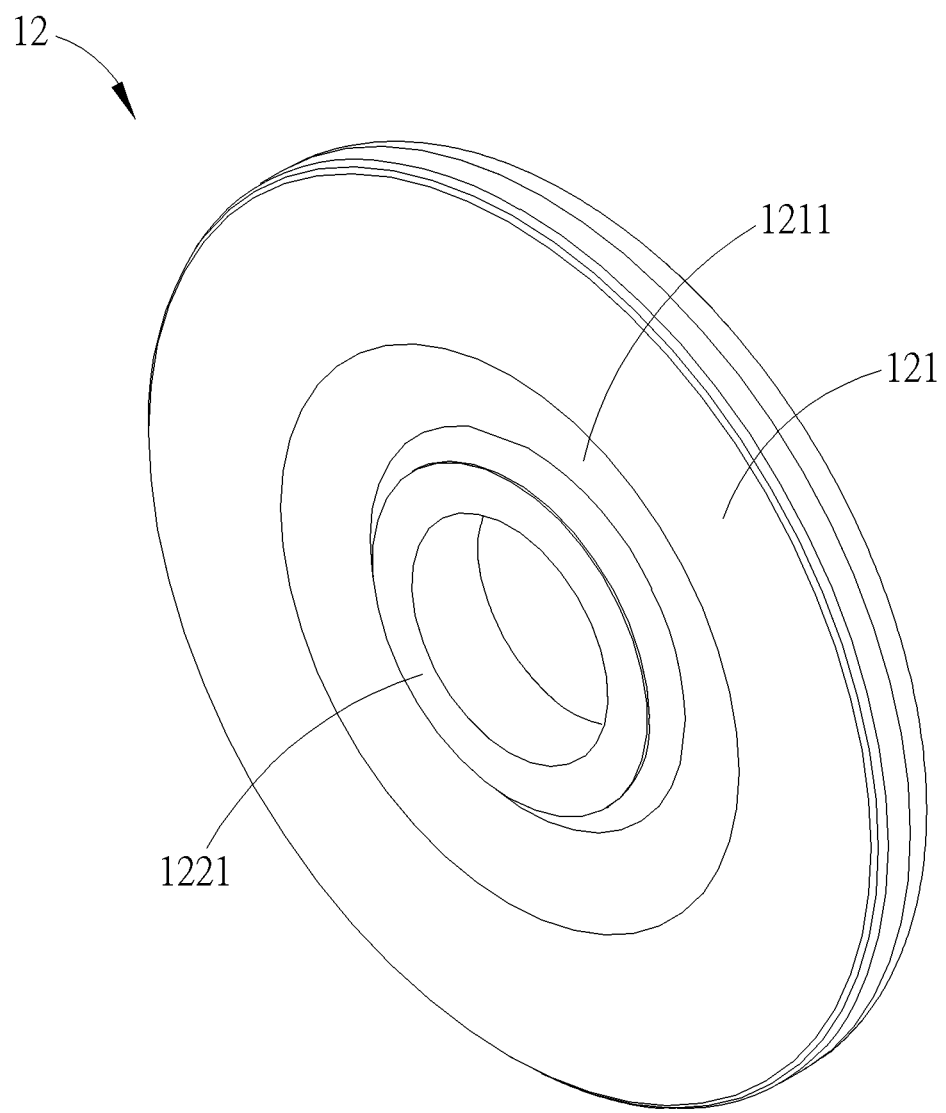
FIG. 6 is another partial diagram of the one-way valve according to the first embodiment of the present invention.
Figure 7:
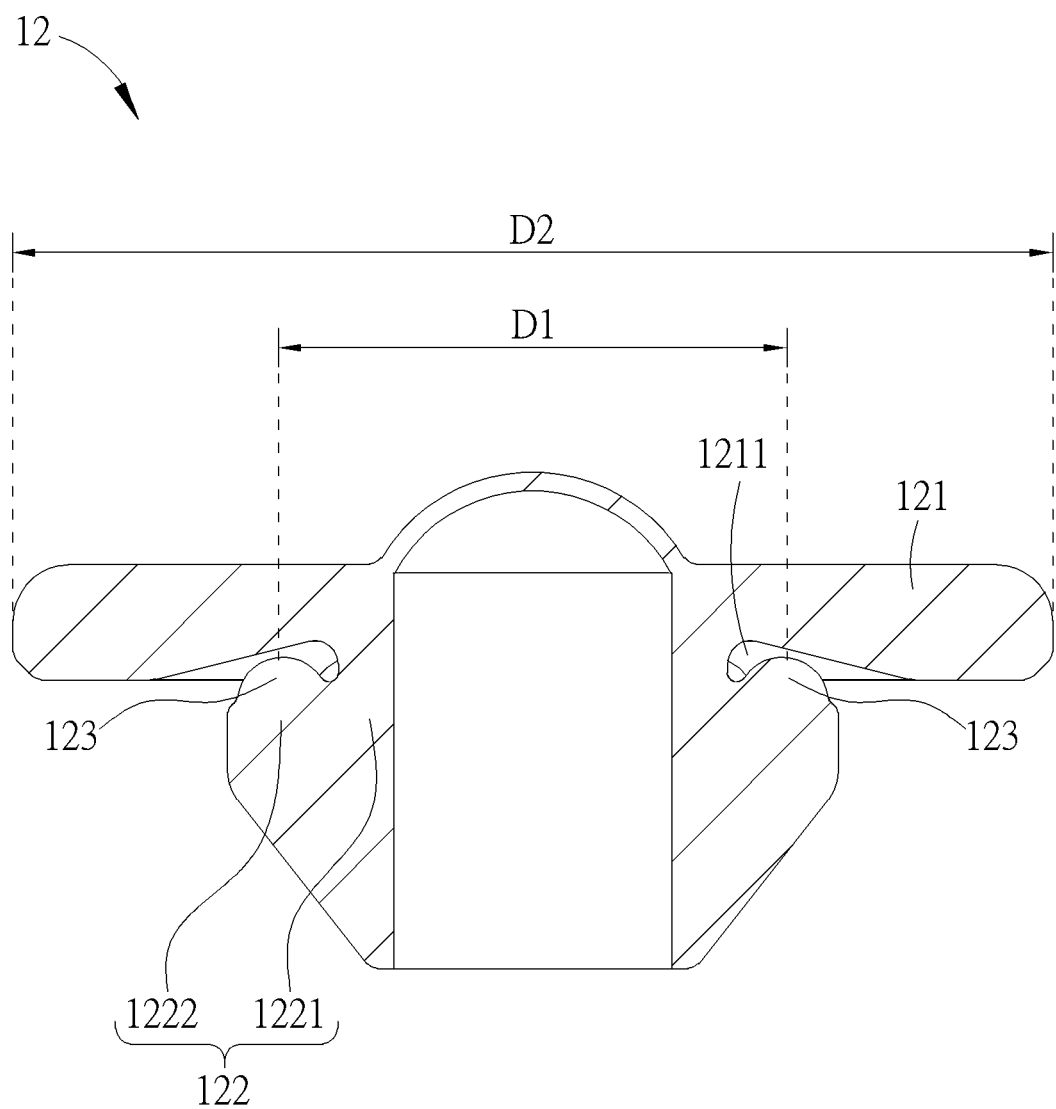
FIG. 7 is a sectional diagram of the one-way valve detached from a container and in a non-deformed state according to the first embodiment of the present invention.

Please refer to FIG. 3 to FIG. 7. FIG. 3 and FIG. 4 are diagrams of the one-way valve 12 at different views according to the first embodiment of the present invention. FIG. 5 is a partial diagram of the one-way valve 12 according to the first embodiment of the present invention. FIG. 6 is another partial diagram of the one-way valve 12 according to the first embodiment of the present invention. FIG. 7 is a sectional diagram of the one-way valve 12 according to the first embodiment of the present invention. As shown in FIG. 3 to FIG. 4, the one-way valve 12 includes an upper portion 121, a lower portion 122 and a plurality of protrusions 123. The upper portion 121 is resiliently deformable. The lower portion 122 is integrally connected to the upper portion 121. The plurality of protrusions 123 protrude from the lower portion 122 toward the upper portion 121 and are separated from the upper portion 121. Two adjacent protrusions 123 of the plurality of protrusions 123 are spaced apart from each other. The plurality of protrusions 123 are configured to abut against the container 11 to resiliently deform the upper portion 121 by the container 11 for allowing air inside the container 11 to be drawn out of the container 11 and preventing ambient air outside the container 11 from entering into the container 11 when the one-way valve 12 is mounted on the container 11. Specifically, in this embodiment, the one-way valve 12 can be a one-piece structure, and the upper portion 121, the lower portion 122 and the plurality of protrusions 123 can be made of same resiliently deformable material. However, the present invention is not limited to this embodiment.

Furthermore, as shown in FIG. 4 to FIG. 7, in this embodiment, each of the plurality of protrusions 123 is formed in a half-ball shape. The lower portion 122 includes a stem body 1221 and a platform structure 1222. The stem body 1221 is integrally connected to the upper portion 121 and is configured to pass through the container 11. The platform 1122 extends from the stem body 1221 and is separated from the upper portion 121, and the plurality of protrusions 123 protrude from the platform structure 1222. The plurality of protrusions 123 are arranged in a circle having a first diameter D1. An outer periphery of the upper portion 121 has a second diameter D2. The second diameter D2 is greater than the first diameter D1. However, the present invention is not limited to this embodiment. For example, in another embodiment, the plurality of protrusions can be arranged in a square shape. Alternatively, in another embodiment, the protrusion can be formed in a cuboid shape.

Besides, as shown in FIG. 4 to FIG. 7, in this embodiment, a recessed structure 1211 is formed on the upper portion 121. Each of the plurality of protrusions 123 is at least partially accommodated inside the recessed structure 1211 when the one-way valve 12 is detached from the container 11 and in a non-deformed state. Each of the plurality of protrusions 123 is moved out of the recessed structure 1211 by the container 11 when the one-way valve 12 is mounted on the container 11. Preferably, a depth of the recessed structure 1211 gradually decreases from inside to outside. Such configuration allows the upper portion 121 of the one-way valve 12 to be resiliently deformed adequately by the container 11 to ensure a proper engagement of the upper portion 121 of the one-way valve 12 and the container 11 for preventing any leakage when the one-way valve 12 is mounted on the container 11. However, the present invention is not limited to this embodiment. For example, in another embodiment, the recessed structure can be omitted.

Figure 8:
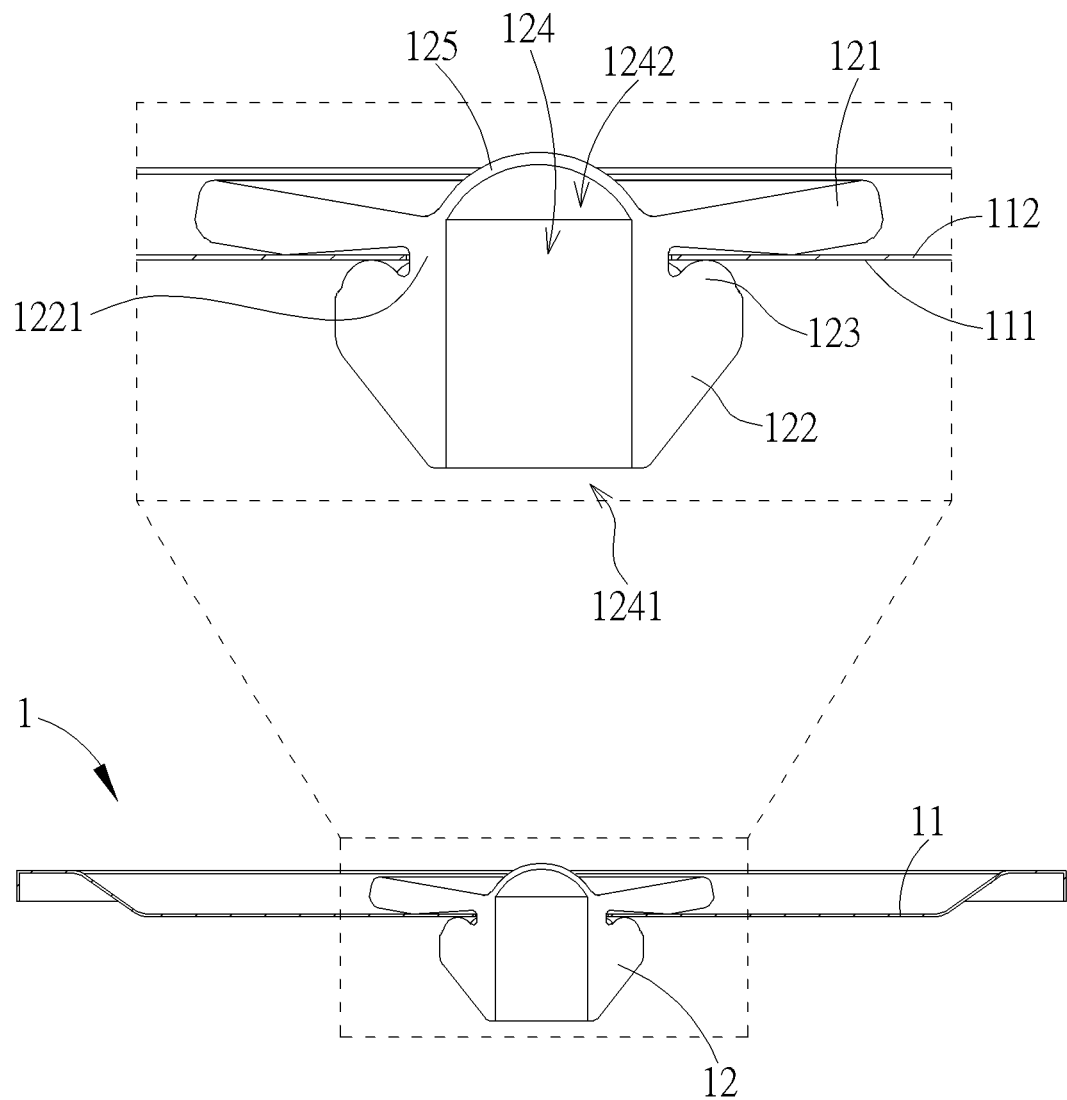
FIG. 8 is a partial diagram of the container kit as the one-way valve is mounted on the container and in a first used state according to the first embodiment of the present invention.
Figure 9:
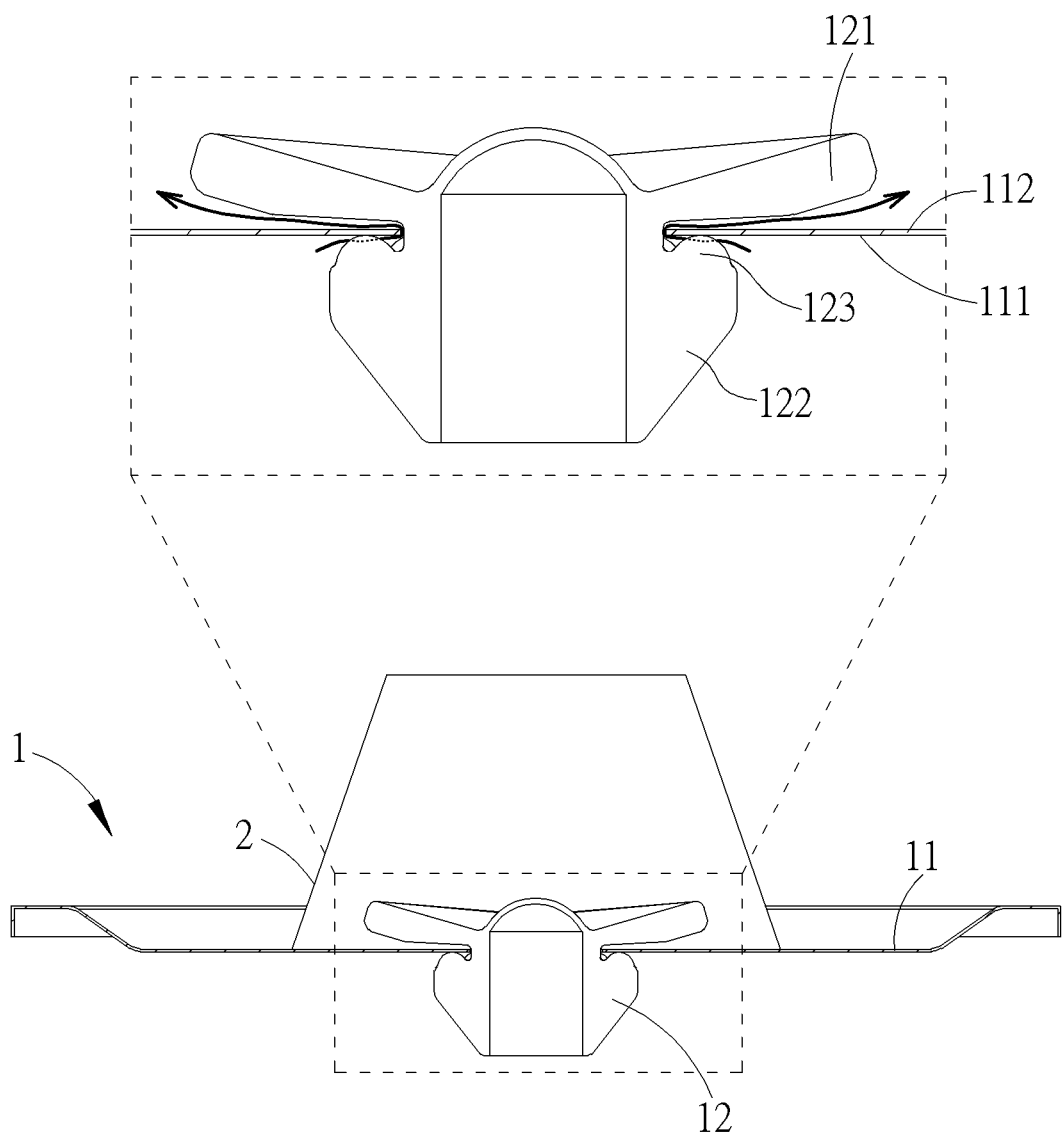
FIG. 9 is a partial diagram of the container kit as the one-way valve is mounted on the container and in a second used state according to the first embodiment of the present invention.

Please refer to FIG. 8 and FIG. 9. FIG. 8 is a partial diagram of the container kit 1 as the one-way valve 12 is mounted on the container 11 and in a first used state according to the first embodiment of the present invention. FIG. 9 is a partial diagram of the container kit 1 as the one-way valve 12 is mounted on the container 11 and in a second used state according to the first embodiment of the present invention. When the one-way valve 12 is mounted on the container 11 by the stem body 1221 passing through the container 11, the one-way valve 12 can be switched between the first used state as shown in FIG. 8 and the second used state as shown in FIG. 9. When the vacuum device 2 is not activated or there is no vacuum device 2, the one-way valve 12 can be in the first used state as shown in FIG. 8. When the one-way valve 12 is in the first used state as shown in FIG. 8, the plurality of protrusions 123 are abutted by an inner surface 111 of the container 11 to resiliently deform the upper portion 121 by an outer surface 112 of the container 11, i.e., the upper portion 121 and the outer surface 112 of the container 11 are resiliently engaged with each other, so as to prevent ambient air outside the container 11 from entering into the container 11. When the vacuum device 2 is provided and activated, the one-way valve 12 can be in the second used state as shown in FIG. 9. When the one-way valve 12 is in the second used state as shown in FIG. 9, the upper portion 121 is driven by the vacuum device 2 to be at least partially separated from the outer surface 112 of the container 11 to provide a fluid passage formed by a space among the two adjacent protrusions 123 of the plurality of protrusions 123 and the inner surface 111 of the container 11 and a space between the upper portion 121 and the outer surface 112 of the container 11, so as to allow air inside the container 11 to be drawn out of the container 11 through the fluid passage by the vacuum device 2. It should be noticed that, as shown in FIG. 8 and FIG. 9, the plurality of protrusions 123 keep being abutted by the inner surface 111 of the container 11 and not separated from the inner surface 111 of the container 11 when the one-way valve 12 is mounted on the container 11.

Figure 10:
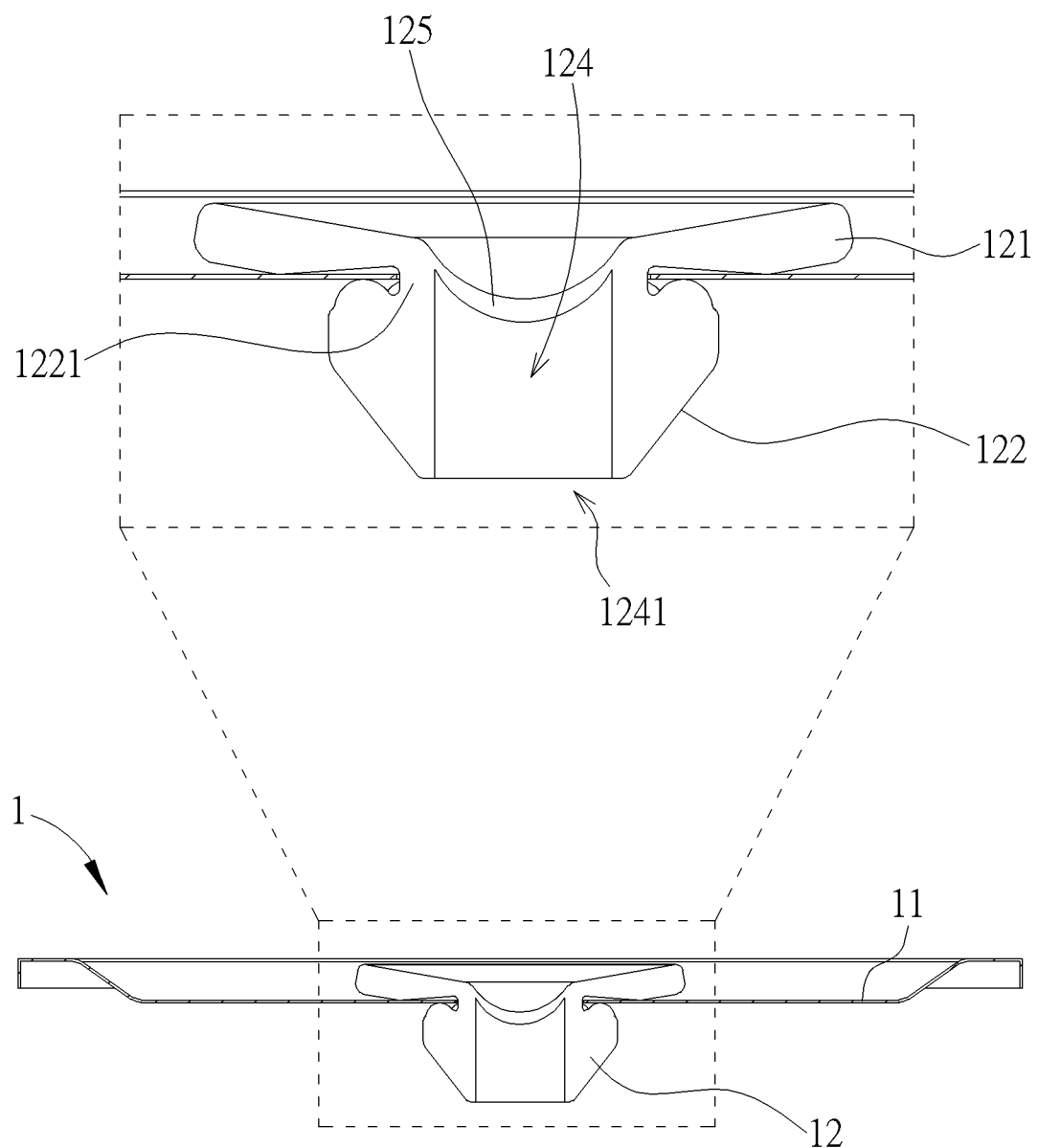
FIG. 10 is a partial diagram of the container kit as the one-way valve is mounted on the container and in a third used state according to the first embodiment of the present invention.

Please refer to FIG. 8 and FIG. 10. FIG. 10 is a partial diagram of the container kit 1 as the one-way valve 12 is mounted on the container 11 and in a third used state according to the first embodiment of the present invention. As shown in FIG. 8 and FIG. 10, the one-way valve 12 further includes a channel structure 124 and a resilient structure 125. The channel structure 124 penetrates the lower portion 122 and the upper portion 121 and has a lower opening 1241 formed on the lower portion 122 and an upper opening 1242 formed on the upper portion 121. Preferably, in this embodiment, the channel structure 124 penetrates the stem body 1221 of the lower portion 122, and the lower opening 1241 is formed on a lower end of the stem body 1221 of the lower portion 122. The resilient structure 125 extends from an upper surface of the upper portion 121 and covers the upper opening 1242. The resilient structure 125 is made of resiliently deformable material, and a thickness of the resilient structure 125 is less than a thickness of the upper portion 121. In such a way, the resilient structure 125 can move between a protruding state as shown in FIG. 8 and a non-protruding state as shown in FIG. 10 by resilient deformation and recovery thereof easily according to a differential pressure between an interior air pressure of the container 11 and an exterior air pressure. Specifically, the resilient structure 125 can move from the protruding state as shown in FIG. 8 to the non-protruding state as shown in FIG. 10 by resilient deformation thereof when the differential pressure between the interior air pressure of the container 11 and the exterior air pressure is increased by drawing the air inside the container 11 out of the container 11, and the resilient structure 125 can move from the non-protruding state as shown in FIG. 10 to the protruding state as shown in FIG. 8 by resilient recovery thereof when the differential pressure between the interior air pressure of the container 11 and the exterior air pressure is decreased by introducing ambient air to flow into the container 11. Therefore, a user can recognize whether an interior of the container 11 is well-vacuumized or not by observing the resilient structure 125.

Figure 11:
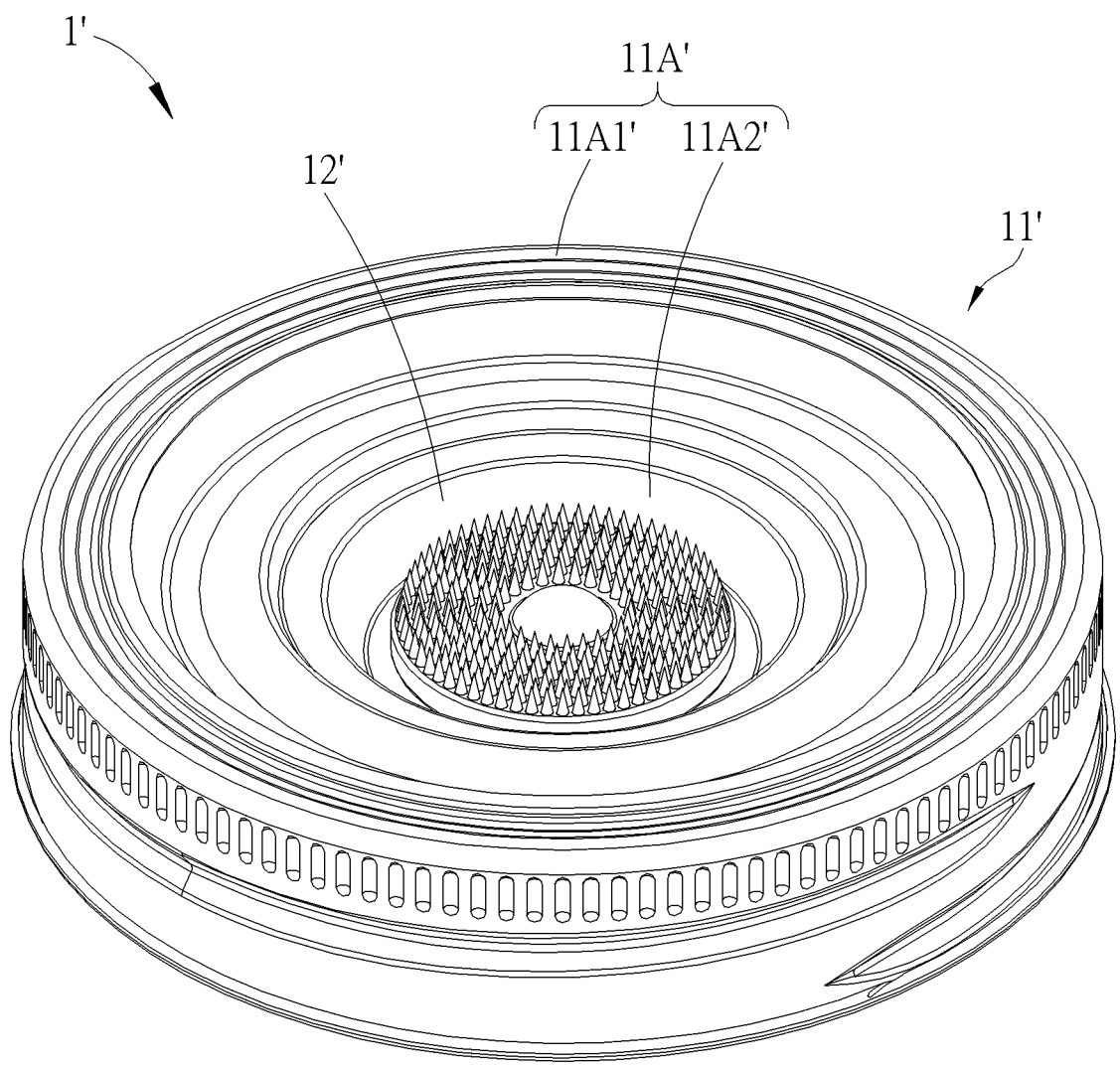
FIG. 11 is a partial diagram of a container kit according to a second embodiment of the present invention.
Figure 12:
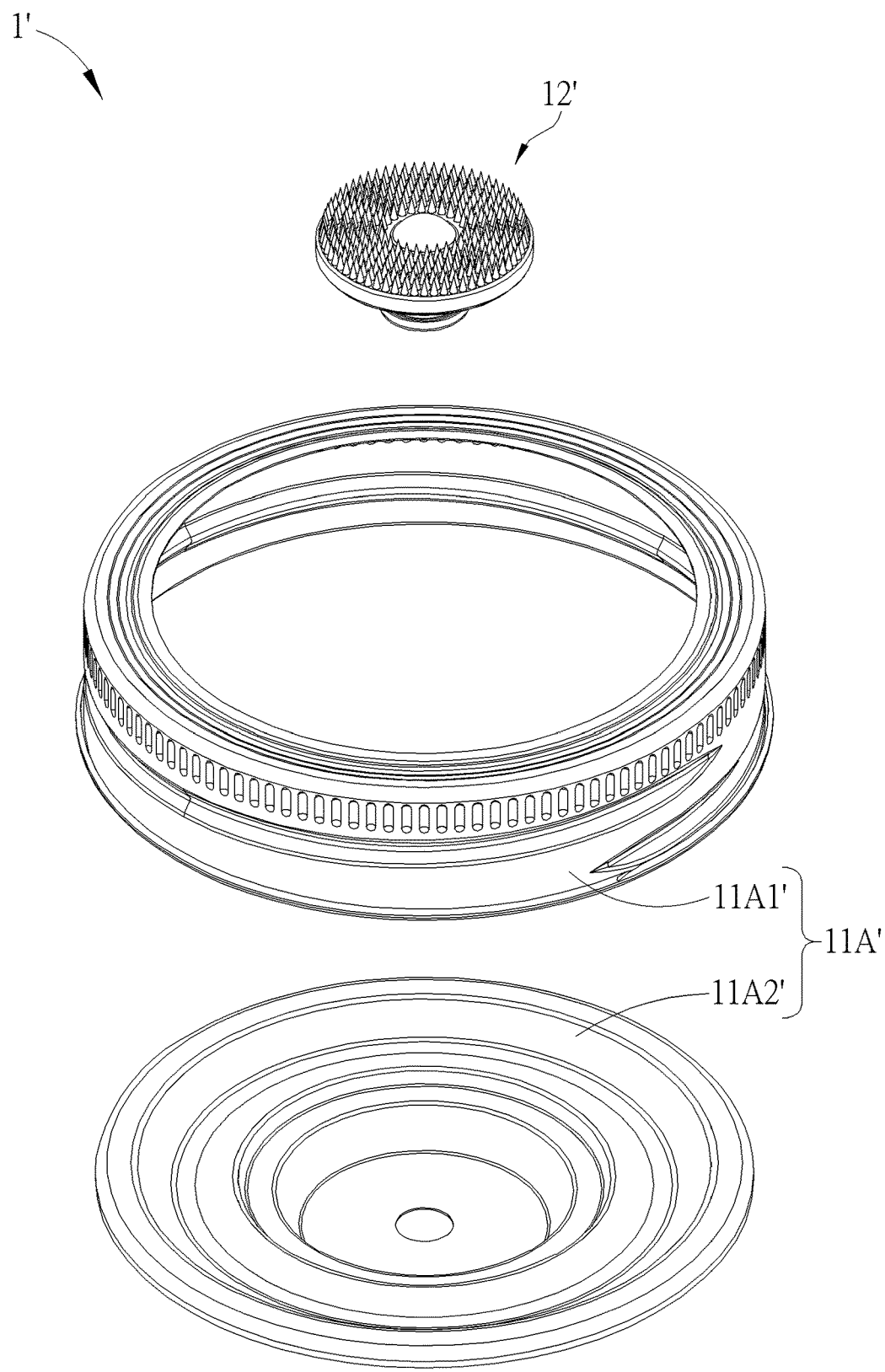
FIG. 12 is a partial exploded diagram of the container kit according to the second embodiment of the present invention.
Figure 13:
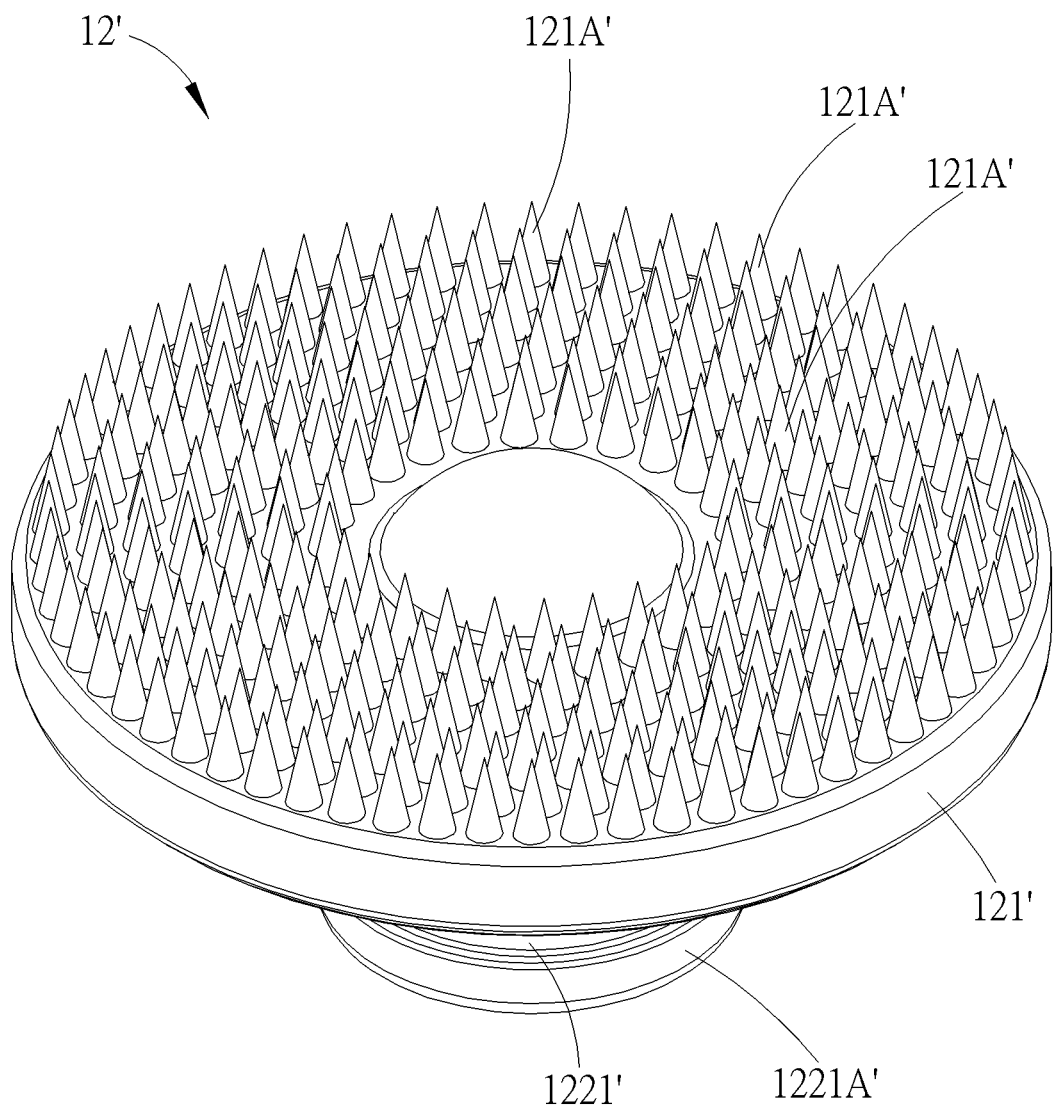
FIG. 13 and FIG. 14 are diagrams of a one-way valve at different views according to the second embodiment of the present invention.
Figure 14:
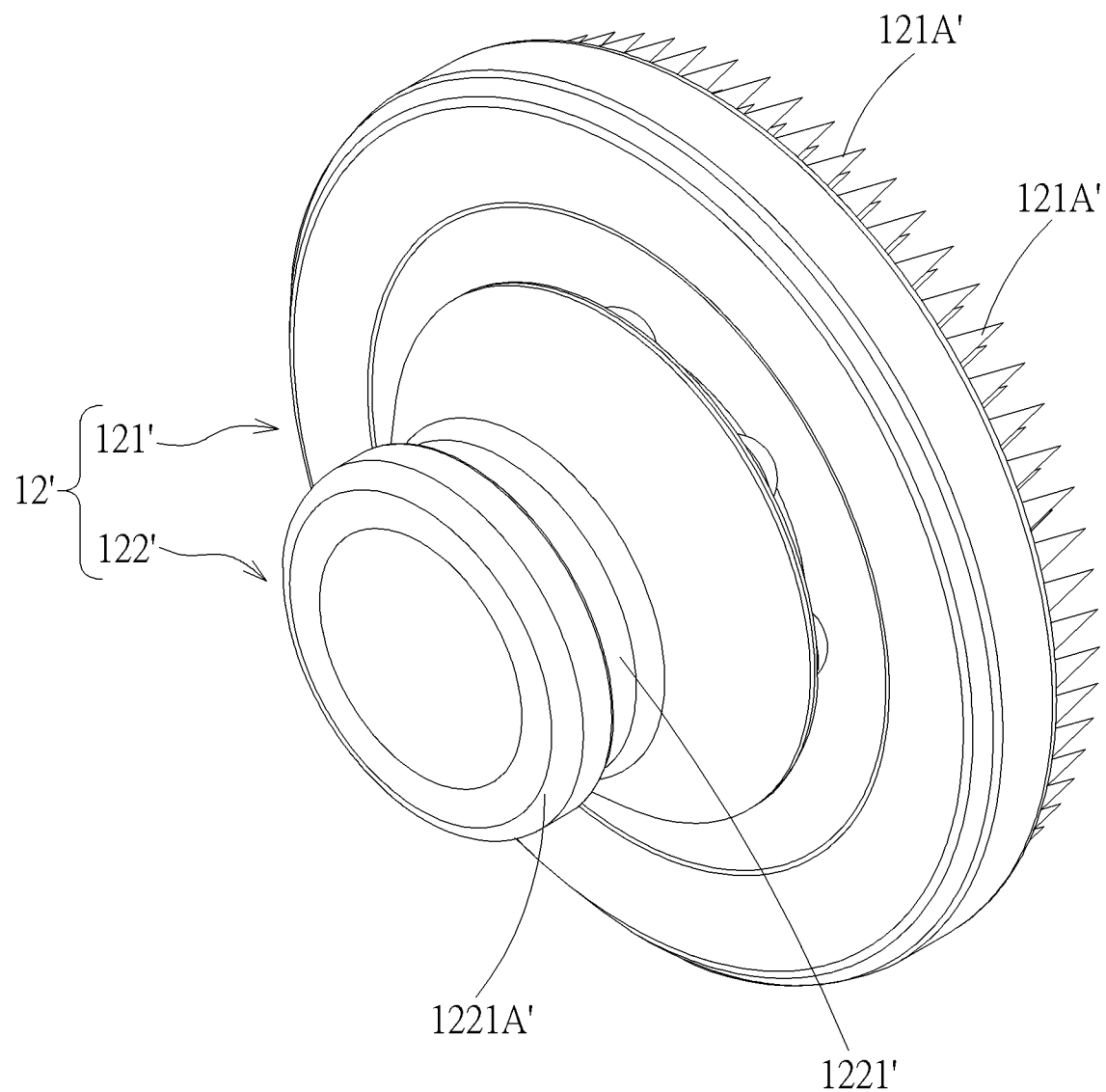
Figure 15:
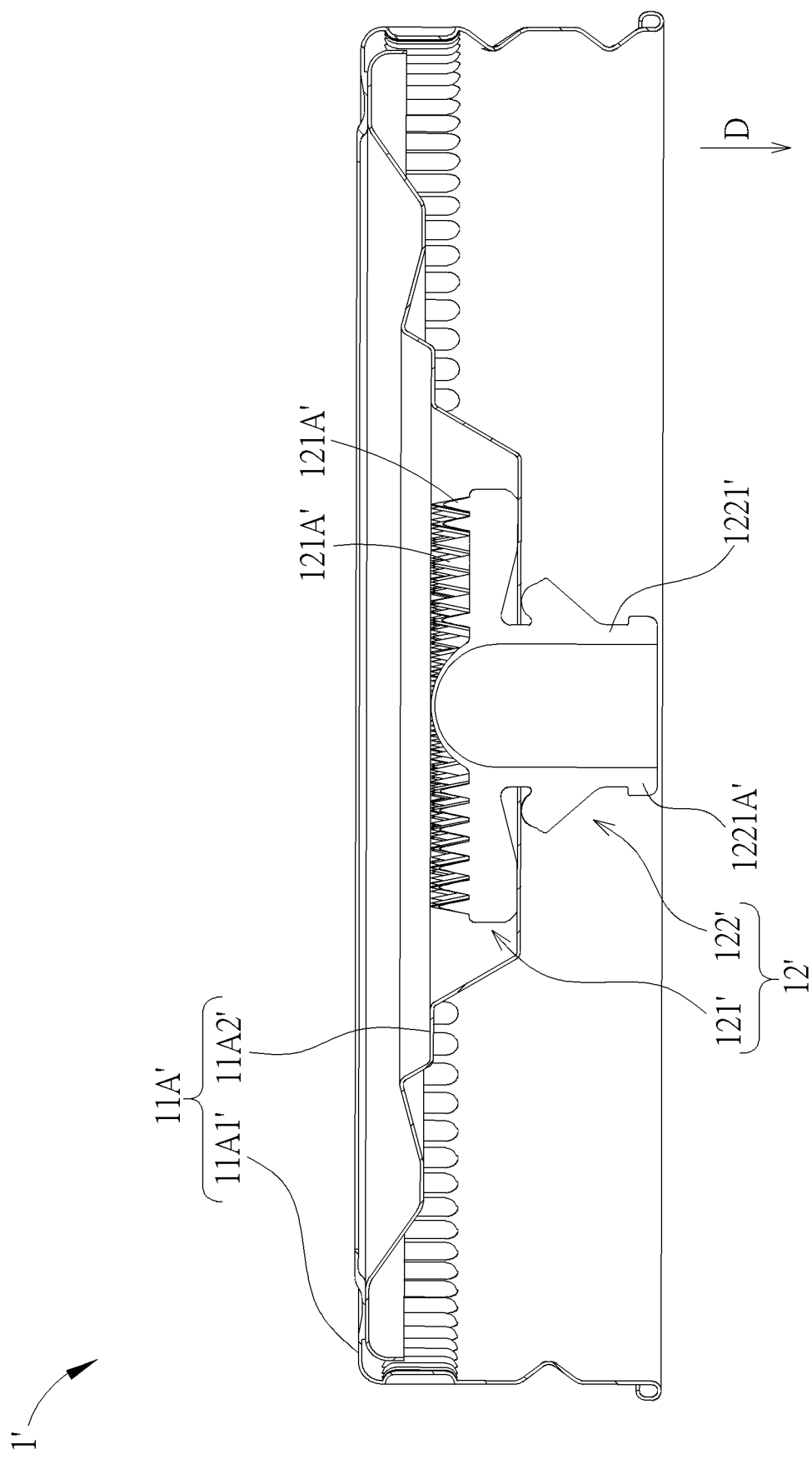
FIG. 15 is a partial sectional diagram of the container kit according to the second embodiment of the present invention.
Figure 16:
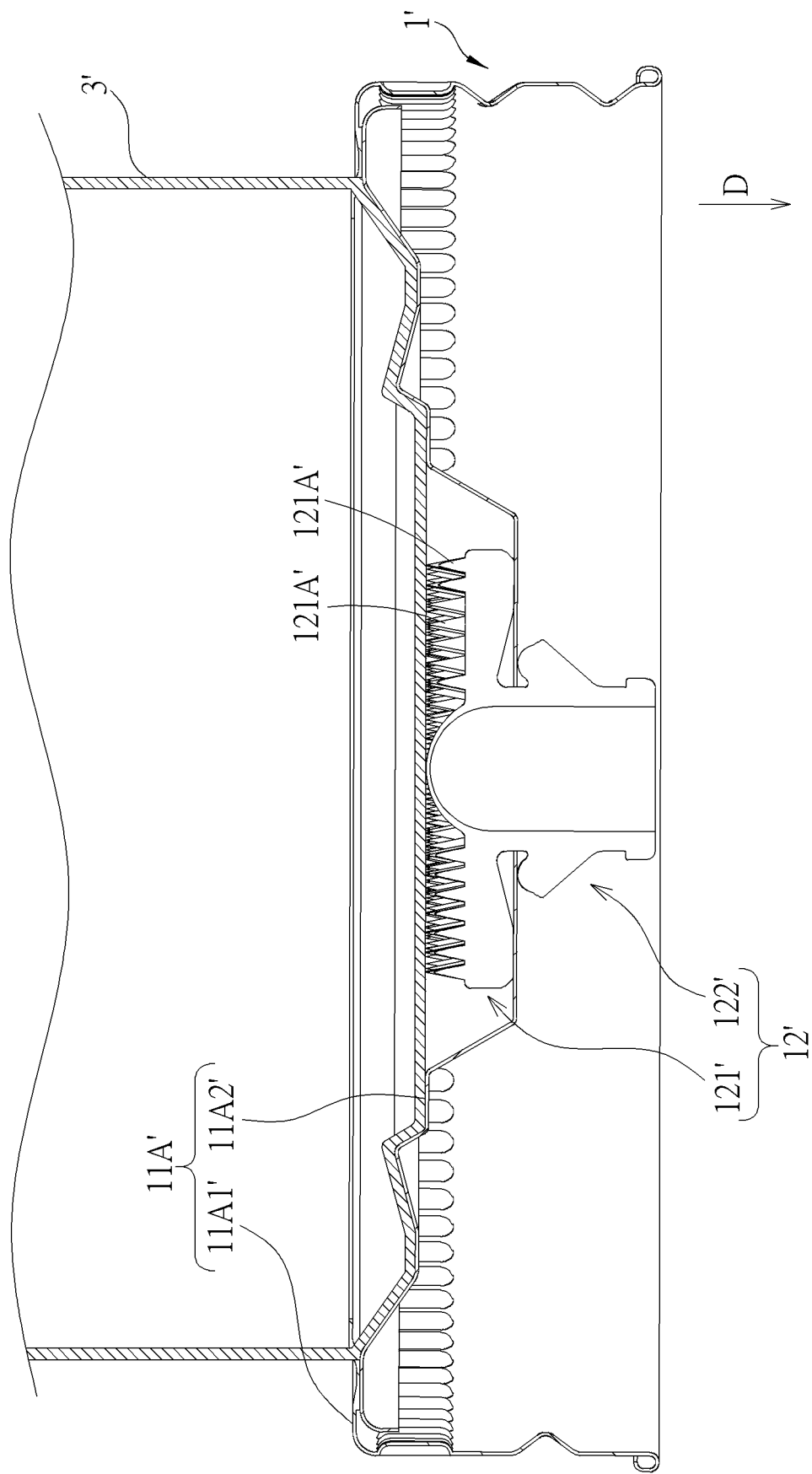
FIG. 16 is a diagram illustrating an additional container is stacked above the container kit according to the second embodiment of the present invention.

Please refer to FIG. 11 to FIG. 16. FIG. 11 is a partial diagram of a container kit 1' according to a second embodiment of the present invention. FIG. 12 is a partial exploded diagram of the container kit 1' according to the second embodiment of the present invention. FIG. 13 and FIG. 14 are diagrams of a one-way valve 12' at different views according to the second embodiment of the present invention. FIG. 15 is a partial sectional diagram of the container kit 1' according to the second embodiment of the present invention. FIG. 16 is a diagram illustrating an additional container 3' is stacked above the container kit 1' according to the second embodiment of the present invention. As shown in FIG. 11 to FIG. 16, different from the first embodiment, in this embodiment, a cover 11A' of a container 11' of the container kit 1' includes an outer part 11A1' and an inner part 11A2' detachably connected to each other, and the one-way valve 12' is mounted on the inner part 11A2' of the cover 11A' of the container 11'. Furthermore, in this embodiment, a plurality of extending structures 121A' formed on an upper surface of an upper portion 121' of the one-way valve 12' and configured to abut against a bottom portion of the additional container 3' to provide a frictional force between the container kit 1' and the additional container 3' for restraining a relative movement of the container kit 1' and the additional container 3' when the additional container 3' is stacked above the container kit 1' and supported by the cover 11A'. Preferably, the extending structure 121A' can be a conical structure and made of resiliently deformable material. Besides, in this embodiment, a protruding ring 1221A' is formed on a lower end of a stem body 1221' of a lower portion 122' of the one-way valve 12' for allowing the one-way valve 12' to be mounted onto the inner part 11A2' of the cover 11A' of the container 11' easily by pulling the protruding ring 1221A' along a predetermined direction D with hands or tools. Other details of this embodiment are the same as the first embodiment and have similar variation. Detailed description is omitted herein for simplicity.

Figure 17:
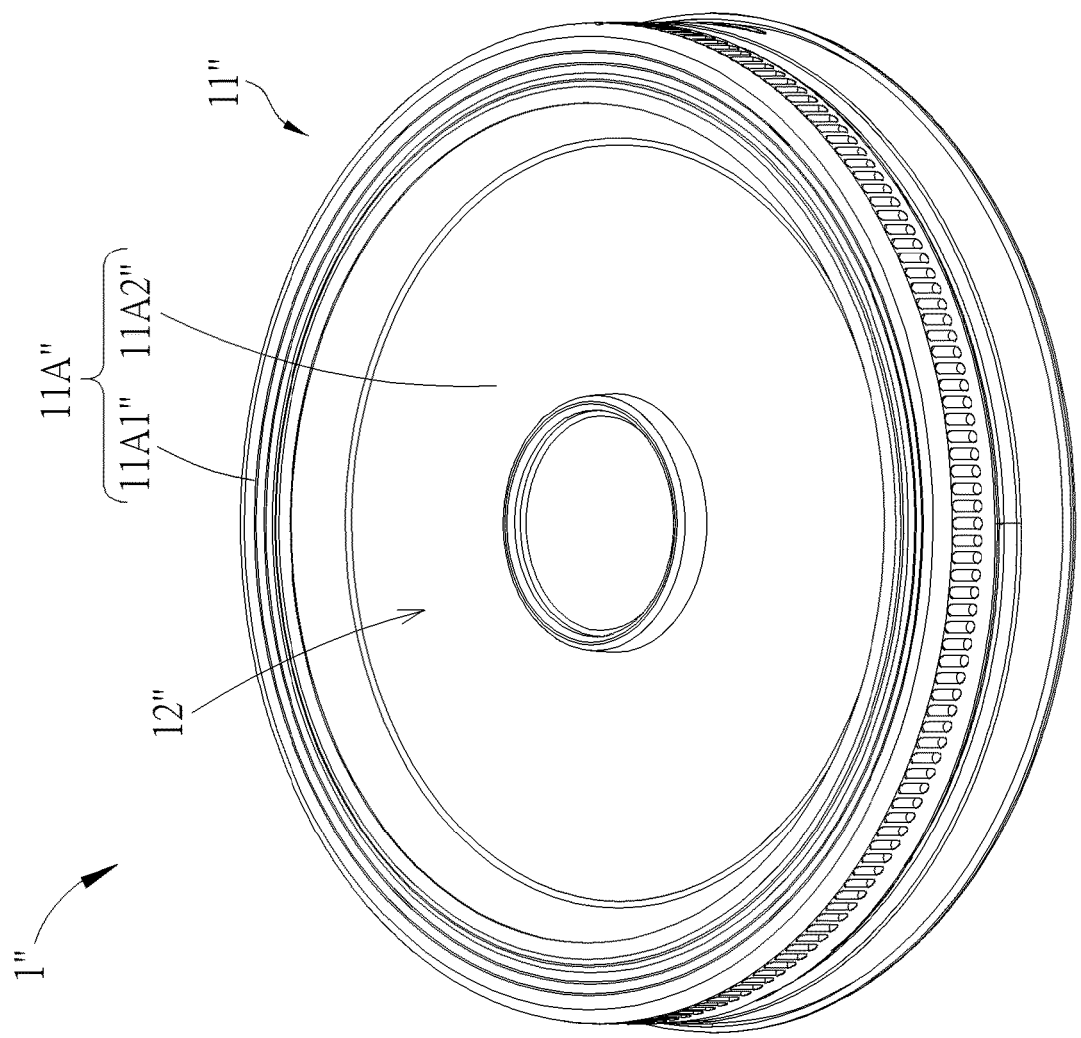
FIG. 17 and FIG. 18 are partial diagrams of a container kit at different views according to a third embodiment of the present invention.
Figure 18:
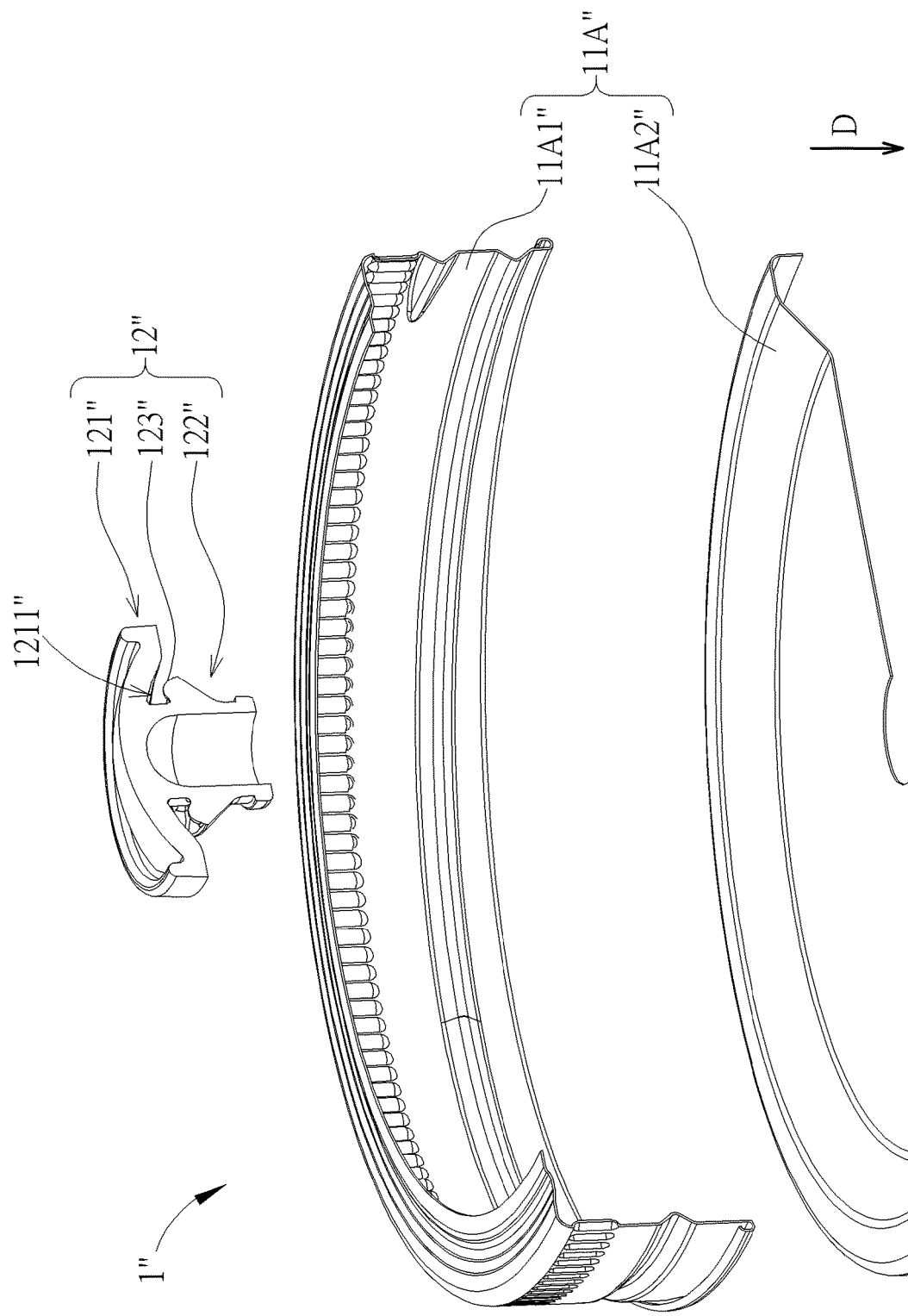
Figure 19:
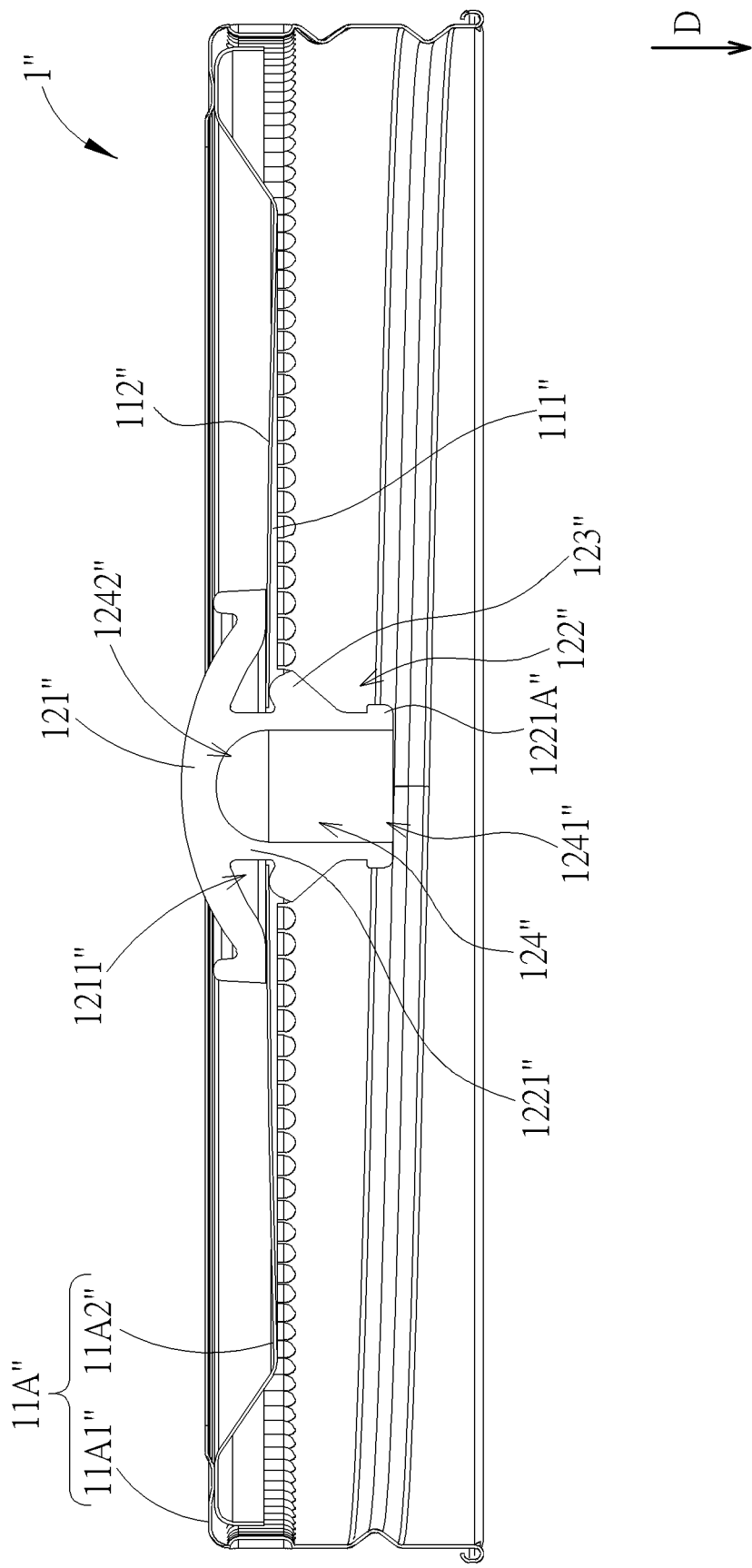
FIG. 19 and FIG. 20 are partial sectional diagrams of the container kit in different states according to the third embodiment of the present invention.
Figure 20:
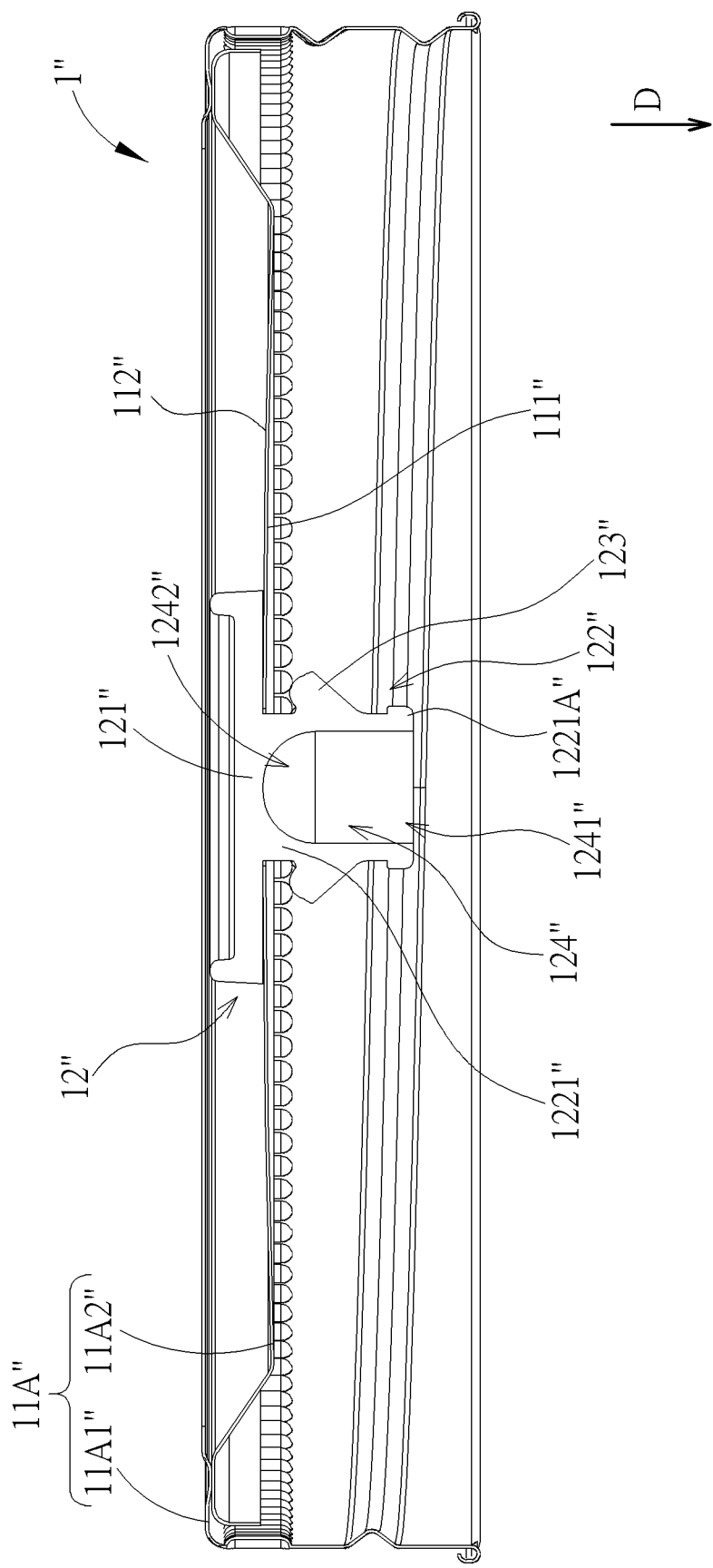

Please refer to FIG. 17 to FIG. 20. FIG. 17 and FIG. 18 are partial diagrams of a container kit 1" at different views according to a third embodiment of the present invention. FIG. 19 and FIG. 20 are partial sectional diagrams of the container kit 1" in different states according to the third embodiment of the present invention. As shown in FIG. 17 to FIG. 20, different from the first embodiment, in this embodiment, a cover 11A" of a container 11" of the container kit 1" includes an outer part 11A1" and an inner part 11A2" detachably connected to each other, and a one-way valve 12" is mounted on the inner part 11A2" of the cover 11A" of a container 11". Furthermore, in this embodiment, a channel structure 124" penetrates a lower portion 122" and has a lower opening 1241" formed on a lower end of the lower portion 122" and an upper opening 1242" formed on an upper end of the lower portion 122". Preferably, the channel structure 124" penetrates a stem body 1221" of the lower portion 122", and the lower opening 1241" and the upper opening 1242" are formed on a lower end and an upper end of the stem body 1221" of the lower portion 122", respectively. An upper portion 121" covers the upper opening 1242" and can move between a protruding state as shown in FIG. 19 and a non-protruding state as shown in FIG. 20 by resilient deformation and recovery thereof easily according to a differential pressure between an interior air pressure of the container 11" and an exterior air pressure. Specifically, the upper portion 121" can move from the protruding state as shown in FIG. 19 to the non-protruding state as shown in FIG. 20 by resilient deformation thereof when the differential pressure between the interior air pressure of the container 11" and the exterior air pressure is increased by drawing the air inside the container 11" out of the container 11", and the upper portion 121" can move from the non-protruding state as shown in FIG. 20 to the protruding state as shown in FIG. 19 by resilient recovery thereof when the differential pressure between the interior air pressure of the container 11" and the exterior air pressure is decreased by introducing ambient air to flow into the container 11". Therefore, a user can recognize whether an interior of the container 11" is well-vacuumized or not by observing the upper portion 121".

It should be noticed that, a plurality of protrusions 123" are abutted by an inner surface 111" of the container 11" and moved out of a recessed structure 1211" formed on a concave part of the upper portion 121" to enable the upper portion 121" to be resiliently deformed by an outer surface 112" of the container 11" when the one-way valve 12" is in a state as shown in FIG. 19, and the plurality of protrusions 123" are driven to be separated from the inner surface 111" of the container 11" by movement of the lower portion 122" due to collapse of the upper portion 121" when the one-way valve 12" is in a state as shown in FIG. 20.

Besides, in this embodiment, a protruding ring 1221A" is formed on the lower end of the stem body 1221" of the lower portion 122" for allowing the one-way valve 12" to be mounted onto the inner part 11A2" of the cover 11A" of the container 11" easily by pulling the protruding ring 1221A" along the predetermined direction D with hands or tools. Other details of this embodiment are the same as the first embodiment and have similar variation. Detailed description is omitted herein for simplicity.

In contrast to the prior art, the one-way valve of the present invention utilizes the plurality of protrusions abutted by the inner surface of the container to enable the upper portion to be resiliently deformed by the outer surface of the container for allowing air inside the container to be drawn out of the container and preventing ambient air outside the container from entering into the container when the one-way valve is mounted on the container. By such configuration, the one-way valve of the present invention is not only suitable for being mounted on a container with a thick wall thickness but also especially suitable for being mounted on a container with a thin wall thickness, e.g., a cover of a mason jar. Therefore, the one-way valve of the present invention is versatile.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A one-way valve adapted for a container, the one-way valve comprising:
   an upper portion being resiliently deformable;
   a lower portion integrally connected to the upper portion;
   a plurality of protrusions protruding from the lower portion toward the upper portion and separated from the upper portion, two adjacent protrusions of the plurality of protrusions being spaced apart from each other, the plurality of protrusions being configured to be abutted by an inner surface of the container to resiliently deform the upper portion by an outer surface of the container;
   wherein a recessed structure is formed on the upper portion, and each of the plurality of protrusions is at least partially accommodated inside the recessed structure when the one-way valve is detached from the container and in a non-deformed state.

2. The one-way valve of claim 1, wherein a depth of the recessed structure gradually decreases from inside to outside.

3. The one-way valve of claim 1, wherein the lower portion comprises a stem body and a platform structure, the stem body is integrally connected to the upper portion and configured to pass through the container when the one-way valve is mounted on the container, the platform structure extends from the stem body and is separated from the upper portion, and the plurality of protrusions protrude from the platform structure.

4. The one-way valve of claim 1, wherein the plurality of protrusions are arranged in a circle having a first diameter, an outer periphery of the upper portion has a second diameter, and the second diameter is greater than the first diameter.

5. The one-way valve of claim 1, wherein when the one-way valve is mounted on the container, the upper portion is configured to be at least partially separated from the outer surface of the container to provide a fluid passage formed by a space among the two adjacent protrusions of the plurality of protrusions and the inner surface of the container and a space between the upper portion and the outer surface of the container.

6. The one-way valve of claim 1, further comprising a channel structure and a resilient structure, the channel structure penetrating the lower portion and the upper portion and having a lower opening formed on the lower portion and an upper opening formed on the upper portion, the resilient structure extending from an upper surface of the upper portion and covering the upper opening, a thickness of the resilient structure being less than a thickness of the upper portion, and the resilient structure being movable between a protruding state and a non-protruding state according to a differential pressure between an interior air pressure of the container and an exterior air pressure.

7. The one-way valve of claim 1, further comprising a channel structure, the channel structure penetrating the lower portion and having a lower opening formed on a lower end of the lower portion and a upper opening formed on an upper end of the lower portion, the upper portion covering the upper opening, and the upper portion being movable between a protruding state and a non-protruding state according to a differential pressure between an interior air pressure of the container and an exterior air pressure.

8. The one-way valve of claim 1, wherein a plurality of extending structures are formed on an upper surface of the upper portion and configured to abut against a bottom portion of an additional container.

9. The one-way valve of claim 1, wherein a protruding ring is formed on a lower end of a stem body of the lower portion.

10. A container kit comprising:
    a container;
    a one-way valve configured to be mounted on the container, the one-way valve comprising:
       an upper portion being resiliently deformable;
       a lower portion integrally connected to the upper portion;
       a plurality of protrusions protruding from the lower portion toward the upper portion and separated from the upper portion, two adjacent protrusions of the plurality of protrusions being spaced apart from each other, the plurality of protrusions being configured to be abutted by an inner surface of the container to resiliently deform the upper portion by an outer surface of the container;
       wherein a recessed structure is formed on the upper portion, and each of the plurality of protrusions is at least partially accommodated inside the recessed structure when the one-way valve is detached from the container and in a non-deformed state.

11. The container kit of claim 10, wherein a depth of the recessed structure gradually decreases from inside to outside.

12. The container kit of claim 10, wherein the lower portion comprises a stem body and a platform structure, the stem body is integrally connected to the upper portion and configured to pass through the container when the one-way valve is mounted on the container, the platform structure extends from the stem body and is separated from the upper portion, and the plurality of protrusions protrude from the platform structure.

13. The container kit of claim 10, wherein the plurality of protrusions are arranged in a circle having a first diameter, an outer periphery of the upper portion has a second diameter, and the second diameter is greater than the first diameter.

14. The container kit of claim 10, wherein when the one-way valve is mounted on the container, the upper portion is configured to be at least partially separated from the outer surface of the container to provide a fluid passage formed by a space among the two adjacent protrusions of the plurality of protrusions and the inner surface of the container and a space between the upper portion and the outer surface of the container.

15. The container kit of claim 10, wherein the one-way valve further comprises a channel structure and a resilient structure, the channel structure penetrates the lower portion and the upper portion and has a lower opening formed on the lower portion and an upper opening formed on the upper portion, and the resilient structure extends from an upper surface of the upper portion and covers the upper opening, a thickness of the resilient structure is less than a thickness of the upper portion, and the resilient structure is movable between a protruding state and a non-protruding state according to a differential pressure between an interior air pressure of the container and an exterior air pressure.

16. The container kit of claim 10, wherein the one-way valve further comprises a channel structure, the channel structure penetrates the lower portion and has a lower opening formed on a lower end of the lower portion and a upper opening formed on an upper end of the lower portion, the upper portion covers the upper opening, and the upper portion is movable between a protruding state and a non-protruding state according to a differential pressure between an interior air pressure of the container and an exterior air pressure.

17. The container kit of claim 10, wherein a plurality of extending structures are formed on an upper surface of the upper portion and configured to abut against a bottom portion of an additional container.

18. The container kit of claim 10, wherein a protruding ring is formed on a lower end of a stem body of the lower portion.

\* \* \* \* \*